US012164528B2

(12) United States Patent
Sato

(10) Patent No.: US 12,164,528 B2
(45) Date of Patent: Dec. 10, 2024

(54) INFORMATION PROCESSING APPARATUS, INFORMATION PROCESSING METHOD, AND STORAGE MEDIUM FOR OBTAINING ANNOTATED TRAINING DATA

(71) Applicant: CANON KABUSHIKI KAISHA, Tokyo (JP)

(72) Inventor: Yoshihisa Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 17/331,454

(22) Filed: May 26, 2021

(65) Prior Publication Data

US 2021/0374147 A1  Dec. 2, 2021

(30) Foreign Application Priority Data

Jun. 1, 2020  (JP) .................................. 2020-095403

(51) Int. Cl.
*G06F 16/2457*  (2019.01)

(52) U.S. Cl.
CPC .. *G06F 16/24575* (2019.01); *G06F 16/24573* (2019.01)

(58) Field of Classification Search
CPC ...................... G06F 16/24575; G06F 16/24573
USPC ......................................................... 707/722
See application file for complete search history.

(56) References Cited

U.S. PATENT DOCUMENTS

| | | | | |
|---|---|---|---|---|
| 9,069,867 B2* | 6/2015 | Rekimoto | ............. | G06F 16/954 |
| 9,158,970 B2* | 10/2015 | Zhang | .................. | G06V 40/172 |
| 10,007,678 B2* | 6/2018 | Tate | ...................... | G06V 10/768 |
| 10,181,075 B2* | 1/2019 | Tojo | ....................... | H04N 5/247 |
| 10,922,100 B2* | 2/2021 | Lee | ......................... | G06F 3/0412 |
| 2002/0013720 A1* | 1/2002 | Ozono | .................... | G06Q 40/00 705/35 |
| 2008/0313214 A1* | 12/2008 | Duhig | .................. | G06F 16/4393 707/999.102 |
| 2009/0157618 A1* | 6/2009 | Matheny | ........... | G06F 16/90324 |
| 2011/0119208 A1* | 5/2011 | Kirshenbaum | ........... | G06N 5/02 706/54 |
| 2012/0196001 A1* | 8/2012 | Camu | ...................... | A23G 1/30 426/631 |

(Continued)

FOREIGN PATENT DOCUMENTS

JP  2019114018 A  7/2019

*Primary Examiner* — Vaishali Shah
(74) *Attorney, Agent, or Firm* — Canon U.S.A., Inc. IP Division

(57) ABSTRACT

A candidate data determination unit acquires a result of estimation of a score representing a likelihood of a label being added as an annotation to target data. A label candidate input unit receives designation of a candidate label from a user. The candidate data determination unit determines candidate data, from a plurality of pieces of labeled data included in a feature space, the candidate data representing a plurality of pieces of labeled data distributed in respective quadrants into which the feature space is divided, wherein the label is added to the labeled data as the annotation, and wherein the feature space is defined using the score, which represents a likelihood of a label being added as an annotation, as an axis. The candidate data determination unit determines, for each of the plurality of quadrants, candidate data based on the labeled data included in each of the plurality of quadrants.

16 Claims, 16 Drawing Sheets

(56) References Cited

U.S. PATENT DOCUMENTS

| | | | | |
|---|---|---|---|---|
| 2014/0140625 | A1* | 5/2014 | Zhang | G06V 20/30 |
| | | | | 382/195 |
| 2014/0272822 | A1* | 9/2014 | Yang | G09B 19/00 |
| | | | | 434/167 |
| 2015/0310072 | A1* | 10/2015 | Dietz | G06F 16/22 |
| | | | | 707/741 |
| 2016/0148070 | A1* | 5/2016 | Tate | G06V 20/00 |
| | | | | 382/195 |
| 2017/0079572 | A1* | 3/2017 | Jang | A61B 5/7275 |
| 2017/0109572 | A1* | 4/2017 | Tojo | G06V 40/10 |
| 2018/0268426 | A1* | 9/2018 | Mathew | H04W 4/02 |
| 2020/0400775 | A1* | 12/2020 | Wakana | G01S 5/0244 |
| 2021/0224602 | A1* | 7/2021 | Nori | G16H 50/20 |

\* cited by examiner

FIG.3

| ID | LABEL | PATH TO DATA |
|---|---|---|
| 1 | LABEL A | AAA\BBB\CCC |
| 2 | LABEL B | DDD\EEE\FFF |
| 3 | LABEL C | GGG\HHH\III |

FIG.4

| ID | LABEL A SCORE | LABEL B SCORE | LABEL C SCORE | LABEL D SCORE |
|---|---|---|---|---|
| 1 | 0.7 | 0.4 | 0.2 | 0.1 |
| 2 | 0.5 | 0.3 | 0.1 | 0.8 |
| 3 | 0.1 | 0.7 | 0.1 | 0.3 |

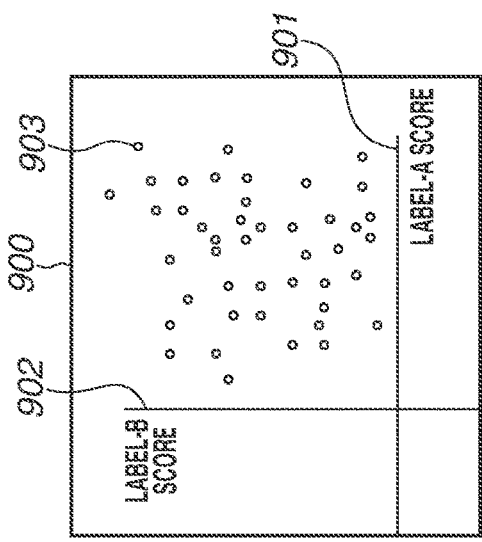
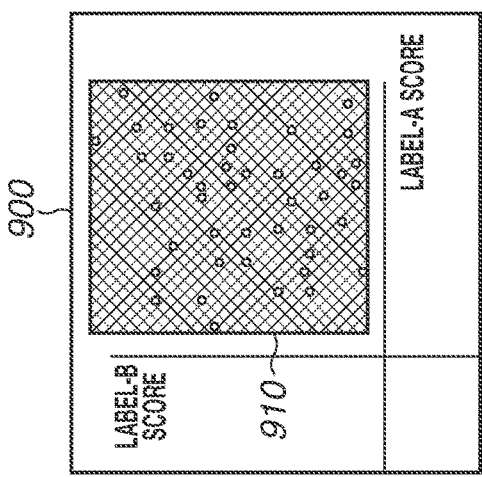
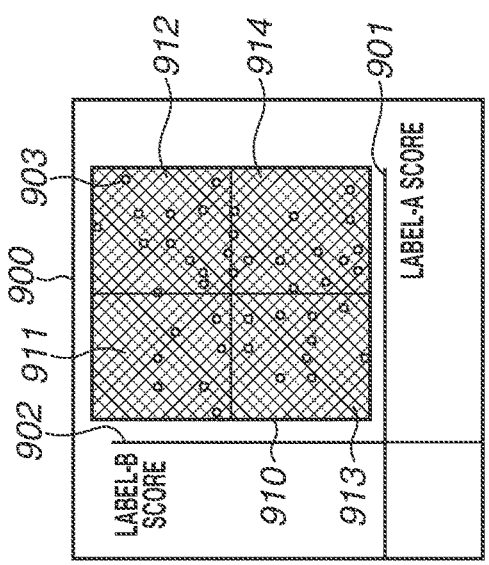
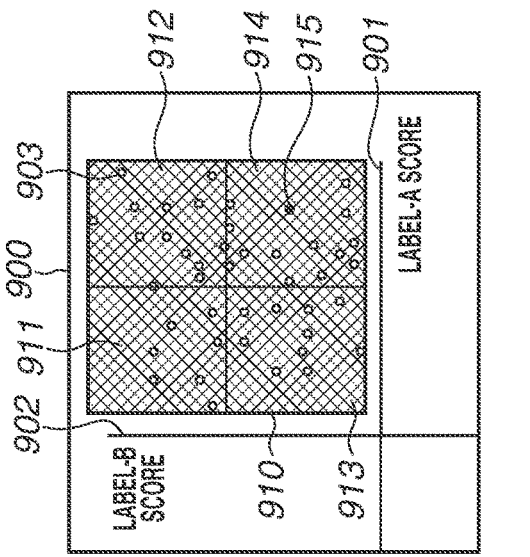
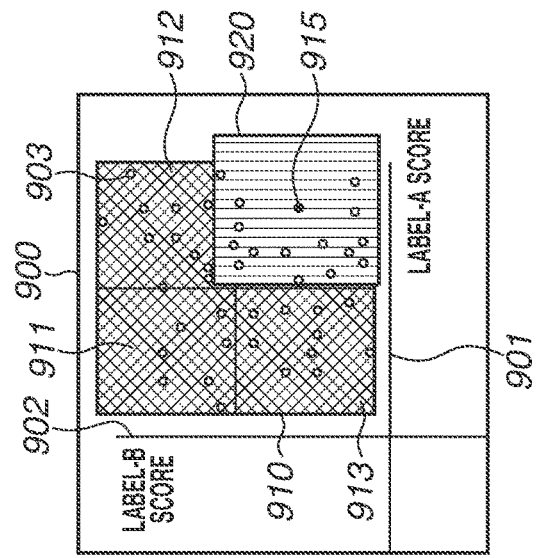
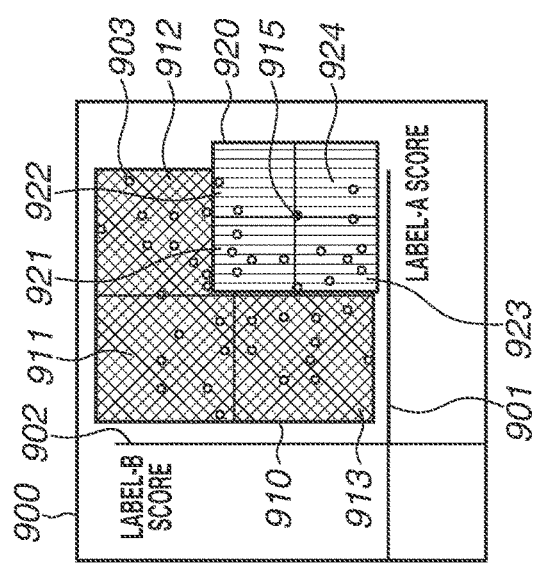

INFORMATION PROCESSING APPARATUS, INFORMATION PROCESSING METHOD, AND STORAGE MEDIUM FOR OBTAINING ANNOTATED TRAINING DATA

BACKGROUND

Field

The present disclosure relates to an information processing apparatus, an information processing method, and a storage medium.

Description of the Related Art

As a program for creating training data to be used for machine learning, an annotation tool for adding correct answer information (correct answer label) to be learned is used. Some annotation tools are provided with, for example, a function group for reducing the workload on a user (i.e., a function group for assisting a user) to create the training data.

For example, to create a machine learning model with a higher performance, it may be desirable to add more accurate correct answer information to training data and to use a larger number of pieces of training data. Accordingly, some annotation tools are provided with a function for assisting a user to more efficiently add more accurate correct answer information to target data to be used for training purposes. For example, Japanese Patent Application Laid-Open No. 2019-114018 discusses an example of a function for assisting a user to determine which correct answer information is to be added to the target data by classifying data to which correct answer information is added based on the correct answer information and presenting the classified data as reference information.

SUMMARY

The number of candidates for data to be used for presenting reference information increases as the number of pieces of data to which correct answer information is added increases. In such a situation, it may become substantially difficult for a user to check all data. In addition, even if some pieces of data are randomly extracted to be used for presenting the reference information, the reference information presented based on an extraction result may not always serve as a reference when the user determines which correct answer information is to be added to target data.

Various embodiments of the present disclosure assist a user to select a label to be added as an annotation in a more desirable manner.

According to various embodiments of the present disclosure, an information processing apparatus includes an acquisition unit configured to acquire a result of estimation of a score representing a likelihood of a label being added as an annotation to target data, a candidate label reception unit configured to receive designation of a candidate label as a candidate for the label to be added as the annotation to the target data, a determination unit configured to determine candidate data, from a plurality of pieces of labeled data included in a feature space, the candidate data representing a plurality of pieces of labeled data distributed in respective quadrants into which the feature space is divided, wherein the label is added to the labeled data as the annotation, and wherein the feature space is defined using the score, which represents a likelihood of a label being added as an annotation, as an axis, and a candidate data output unit configured to output, to a predetermined output destination, the candidate data determined for respective quadrants.

Further features of various embodiments of the present disclosure will become apparent from the following description of exemplary embodiments with reference to the attached drawings.

BRIEF DESCRIPTION OF THE DRAWINGS

FIG. 3 is a table illustrating an example of a data structure for management of labeled data according to one embodiment.

FIG. 4 is a table illustrating an example of a data structure for management of score estimation results according to one embodiment.

FIGS. 9A to 9F are diagrams each illustrating processing for dividing an area of point group data into a plurality of quadrants according to one embodiment.

DESCRIPTION OF THE EMBODIMENTS

Figure 1:
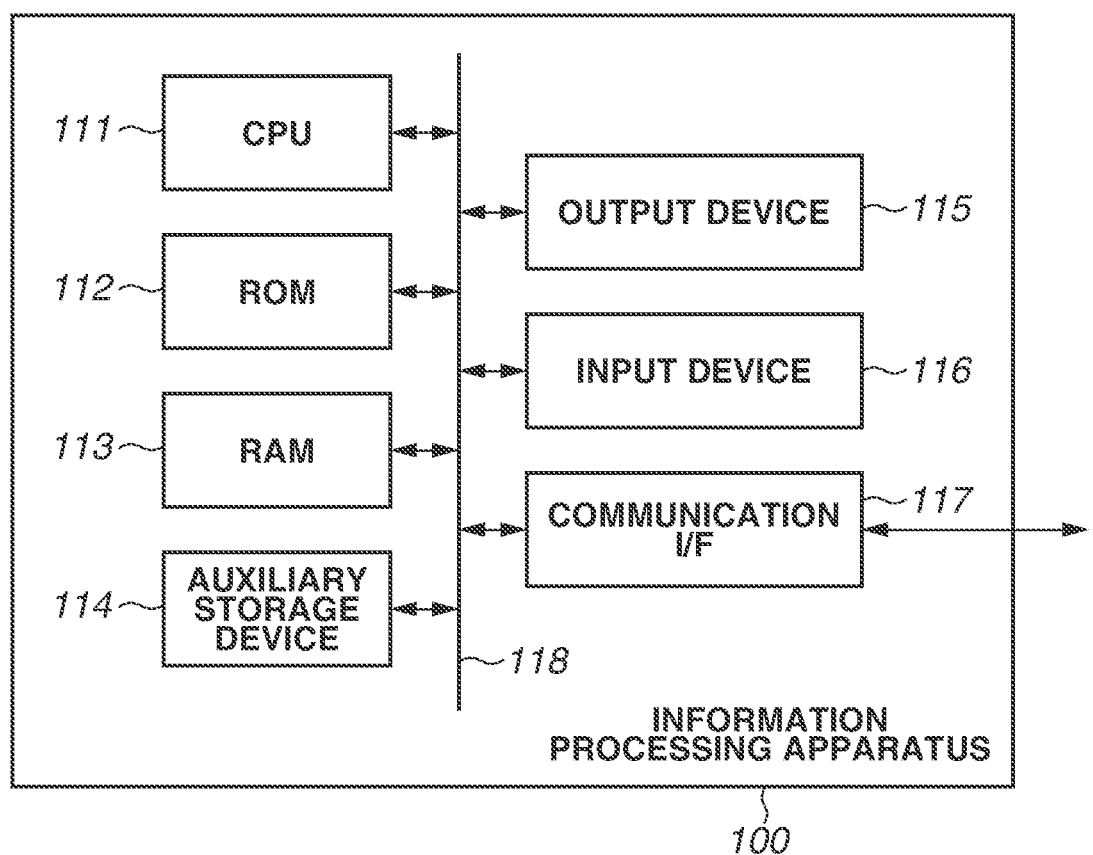
FIG. 1 is a block diagram illustrating an example of a hardware configuration of an information processing apparatus according to one embodiment.

Exemplary embodiments of the present disclosure will be described in detail below with reference to the accompanying drawings. Components having substantially the same functional configuration in the specification and the drawings are denoted by the same reference numerals, and redundant descriptions are omitted.

Outline of Annotation

Supervised learning is an example of a technique for training a machine learning model (in other words, constructing a machine learning model) based on what is called machine learning. In supervised learning, a data set including training data in which data to be input to a learning model is associated with a correct answer label to be predicted based on the data, is used to construct the machine learning model. In the case of constructing the machine learning model, if such a data set is not present or incomplete, for example, the data set is constructed by an annotation operation for adding a correct answer label as an annotation to the data after the data to be input is collected. An annotation tool including a function for assisting a user to perform an operation for adding a correct answer label to data so that the user can more easily perform the annotation operation is used in some cases.

The annotation tool presents data on an image, a document, or the like to be annotated (hereinafter also referred to as target data) to the user and receives designation of a correct answer label to be added as an annotation to the target data from the user. Then, the annotation tool adds the correct answer label designated by the user to the target data, thereby generating training data to be included in the data set.

Among various types of annotation tools, there is a tool that uses a machine learning model constructed based on preliminary machine learning (hereinafter also referred to as a trained model) to efficiently perform a labeling operation for adding the correct answer label to the target data as described above. As a specific example, the tool that uses the trained model causes the trained model to analyze target data to extract candidates for a label to be added as an annotation to the target data, and presents the extracted candidates for the label to the user. This enables the user to select a candidate to be added as the correct answer label to the target data from among the candidates for the label presented by the annotation tool.

To create a machine learning model with a higher performance, it may be desirable to use more accurate correct answer information to add to training data and to use a larger number of pieces of training data. Accordingly, some annotation tools are provided with a function for assisting a user so that the user can more efficiently add more accurate correct answer information to the target data to be used for training purposes.

As an example of such a user assist function provided by the annotation tool described above, a function for classifying data to which correct answer information is added based on the correct answer information and presenting the classified data as reference information is proposed.

On the other hand, the number of candidates for data to be used for presenting the reference information increases as the number of pieces of data to which correct answer information is added increases. In such a situation, it may become substantially difficult for the user to check all data. In addition, even if some pieces of data are randomly extracted to be used for presenting the reference information, conditions for the extraction may not always be appropriate. Accordingly, the reference information presented based on an extraction result may not always serve as a reference when the user determines which correct answer information is to be added to target data.

Thus, the present disclosure proposes a technique related to an annotation tool capable of assisting a user to select a label to be added as an annotation to target data in a more desirable mode.

An existing trained machine learning model is hereinafter also referred to as a pre-trained model, and a label to be selected as a candidate for correct answer information to be added to data to be annotated is hereinafter also referred to as a candidate label. Data to be subjected to the annotation operation is hereinafter also referred to as target data, and data to which the correct answer information is already added as an annotation is hereinafter also referred to as labeled data.

An example of a hardware configuration of an information processing apparatus 100 according to an exemplary embodiment of the present disclosure will be described with reference to FIG. 1. As illustrated in FIG. 1, the information processing apparatus 100 according to the present exemplary embodiment includes a central processing unit (CPU) 111, a read-only memory (ROM) 112, and a random access memory (RAM) 113. The information processing apparatus 100 also includes an auxiliary storage device 114, an output device 115, an input device 116, and a communication interface (I/F) 117. The CPU 111, the ROM 112, the RAM 113, the auxiliary storage device 114, the output device 115, the input device 116, and the communication I/F 117 are interconnected via a bus 118.

The CPU 111 is a central processing unit that controls various operations of the information processing apparatus 100. For example, the CPU 111 may control the operation of the entire information processing apparatus 100. The ROM 112 stores a control program, a boot program, and the like that can be executed by the CPU 111. The RAM 113 is a main storage memory for the CPU 111 and is used as a work area or a temporary storage area for loading various programs.

The auxiliary storage device 114 stores various data and various programs. The auxiliary storage device 114 is implemented by a storage device capable of temporarily or persistently storing various data, such as a nonvolatile memory as typified by a hard disk drive (HDD) and a solid state drive (SSD).

The output device 115 is a device that outputs various information and is used to present various information to the user. In the present exemplary embodiment, the output device 115 is implemented by a display device such as a display. The output device 115 displays various display information, thereby presenting information to the user. In another example, the output device 115 may be implemented by an acoustic output device that outputs a sound such as a voice or an electronic sound. In this case, the output device 115 outputs the sound such as the voice or electronic sound to thereby present information to the user. The device applied as the output device 115 may be appropriately changed depending on a medium to be used for presenting the information to the user.

The input device 116 is used to receive various instructions from the user. In the present exemplary embodiment, the input device 116 includes input devices such as a mouse, a keyboard, and a touch panel. In another example, the input device 116 may include a sound collecting device, such as a microphone, to collect a voice spoken by the user. In this case, various analysis processing, such as acoustic analysis and natural language processing, is performed on the collected voice, so that the content indicated by the voice can be recognized as an instruction from the user. The device applied as the input device 116 may be appropriately changed depending on a method of recognizing the instruction from the user. A plurality of types of devices may be applied as the input device 116.

The communication OF 117 is used for communication with an external apparatus via a network. The device applied as the communication I/F 117 may be appropriately changed depending on the type of a communication path or a communication method to be applied.

Figure 2:
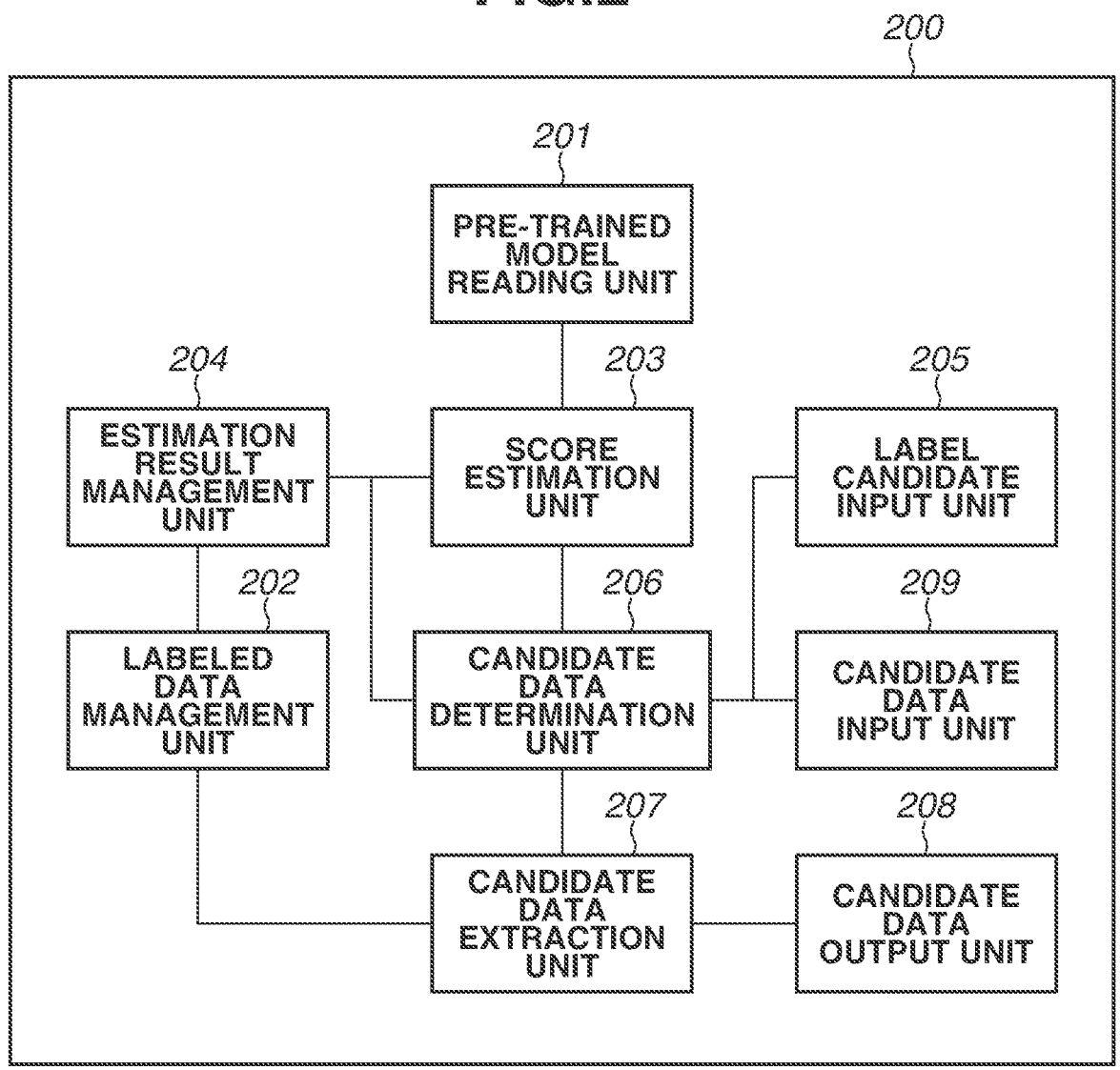
FIG. 2 is a block diagram illustrating an example of a functional configuration of an information processing apparatus according to one embodiment.
Figure 10:
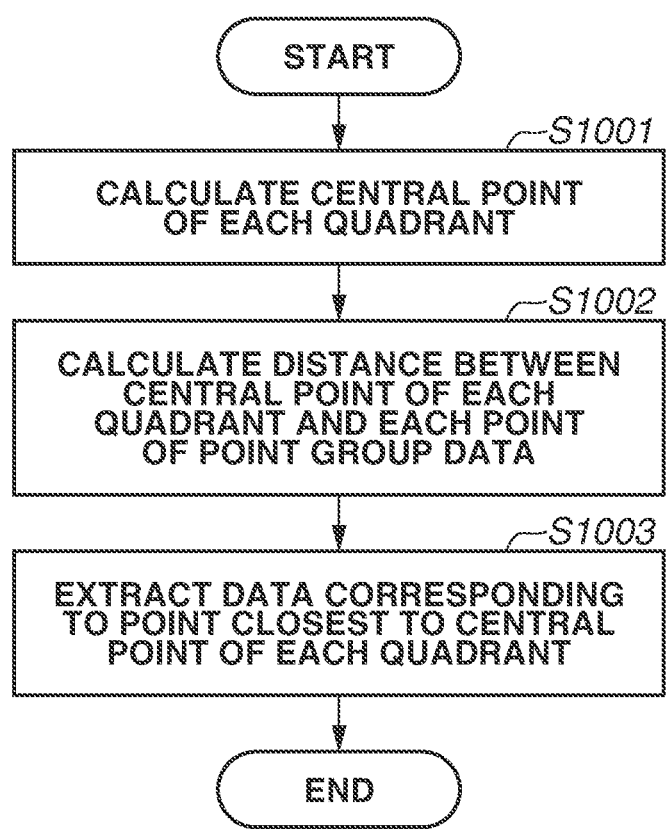
FIG. 10 is a flowchart illustrating an example of processing to be performed by the information processing apparatus according to one embodiment.
Figure 11:
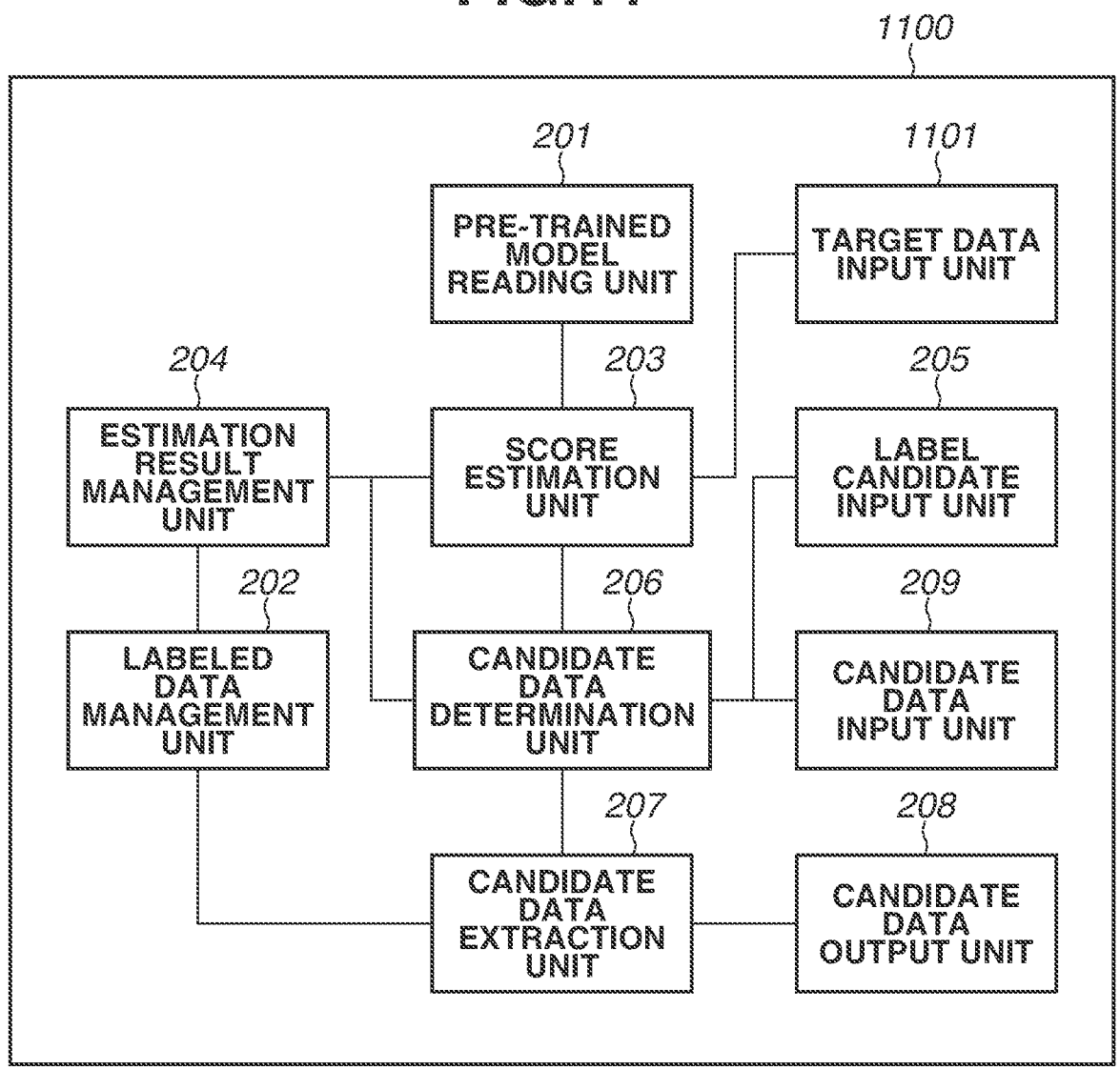
FIG. 11 is a block diagram illustrating another example of the functional configuration of an information processing apparatus according to one embodiment.
Figure 12:
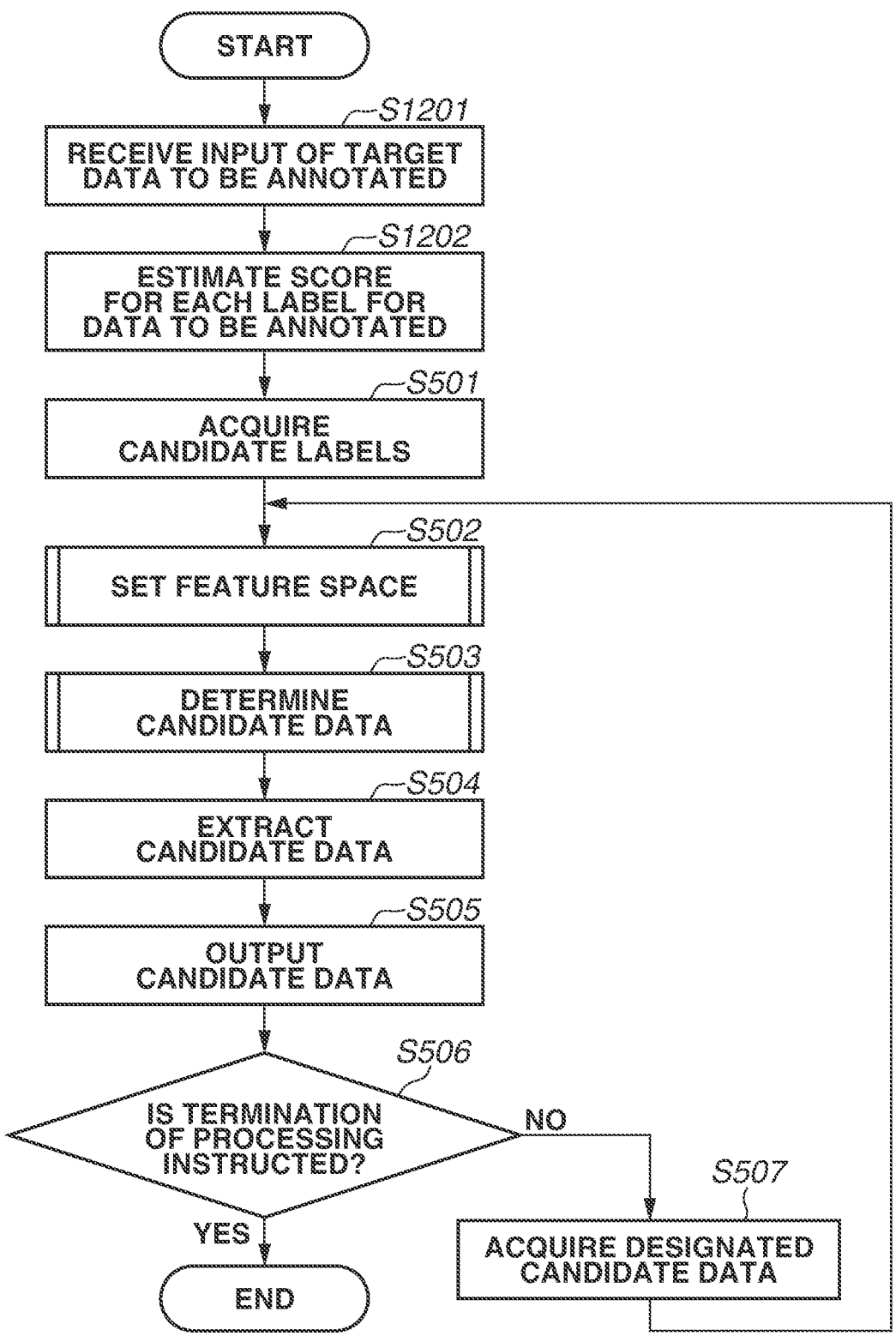
FIG. 12 is a flowchart illustrating another example of processing to be performed by the information processing apparatus according to one embodiment.
Figure 13:
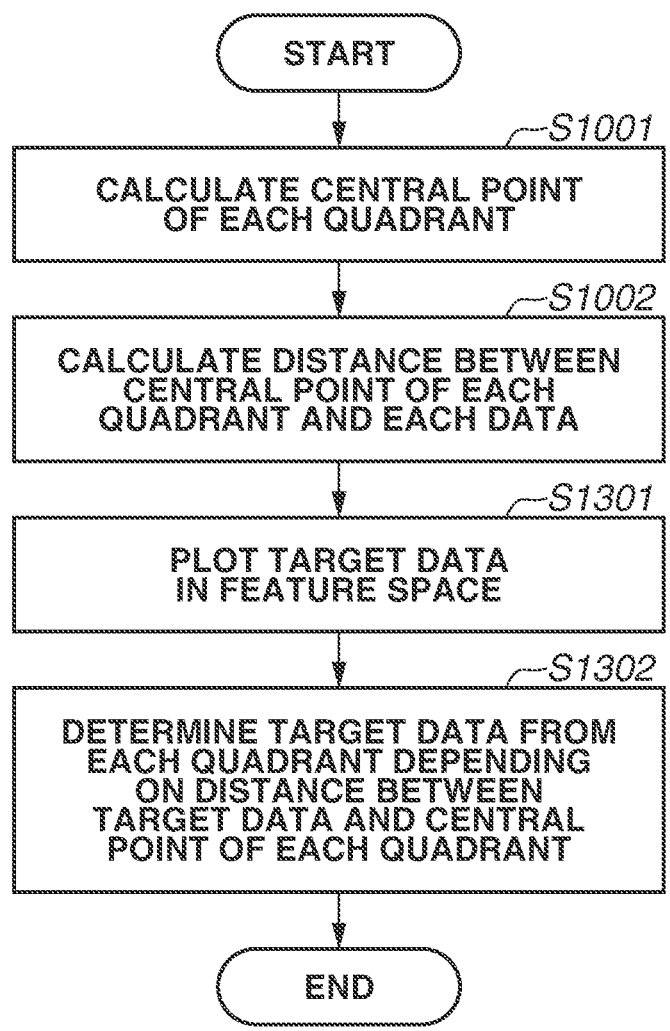
FIG. 13 is a flowchart illustrating still another example of processing to be performed by the information processing apparatus according to one embodiment.
Figure 14:
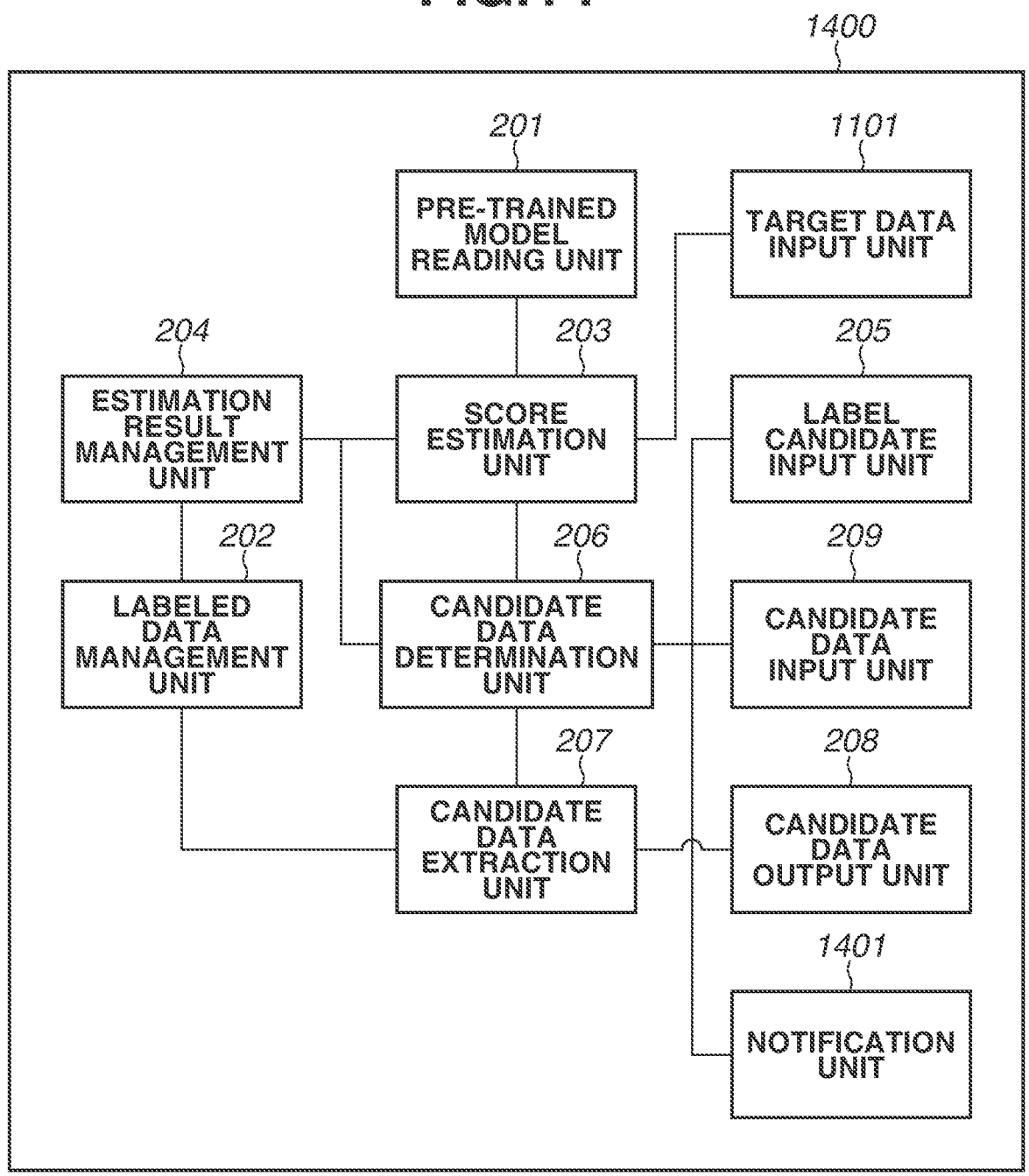
FIG. 14 is a block diagram illustrating still another example of the functional configuration of an information processing apparatus according to one embodiment.

The CPU 111 loads programs stored in the ROM 112 or the auxiliary storage device 114 into the RAM 113 and executes the programs, thereby implementing functional configurations illustrated in FIGS. 2, 11, and 14. Processing illustrated in flowcharts of FIGS. 5, 8, 10, 12, 13, and 15 is implemented by executing the programs.

As a storage medium for supplying the programs, for example, a flexible disk, a hard disk, an optical disk, and a magneto-optical disk can be used. Other examples of the storage medium may include a compact disc (CD)-ROM, a CD-recordable (R), a magnetic tape, a nonvolatile memory card, a ROM, and a digital versatile disc (DVD).

The programs may be directly executed by a computer, or may be executed under management of underlying software such as an operating system (OS) that runs on the computer.

The programs read from the storage media may be processed by a function expansion board mounted on the computer, a function expansion unit connected to the computer, or the like.

A first exemplary embodiment of the present disclosure will be described below. To distinguish an information processing apparatus according to the first exemplary embodiment from information processing apparatuses according to other exemplary embodiments, the information processing apparatus according to the first exemplary embodiment is hereinafter also referred to as an information processing apparatus 200 for convenience of explanation.

In the present exemplary embodiment and the other exemplary embodiments to be described below, descriptions may be made by focusing on a case where image data is used as data to which correct answer information (label) is added as an annotation to facilitate explanation of technical features of the present disclosure. However, the image data is merely an example, and a type of data to which the correct answer information is added by the information processing apparatus to which the technique according to the present disclosure is applied is not intended to be limited. In other words, the type of data to which the correct answer information is added may be appropriately changed within a scope not departing from the basic idea of the technique according to the present disclosure.

Functional Configuration

An example of a functional configuration of the information processing apparatus 200 according to the present exemplary embodiment will be described with reference to FIG. 2. The information processing apparatus 200 includes a pre-trained model reading unit 201, a labeled data management unit 202, a score estimation unit 203, an estimation result management unit 204, a candidate data determination unit 206, and a candidate data extraction unit 207. The information processing apparatus 200 also includes a label candidate input unit 205, a candidate data output unit 208, and a candidate data input unit 209.

The pre-trained model reading unit 201 reads a learning model constructed by preliminary training a model (pre-trained model). A unit from which the pre-trained model is read is not particularly limited as long as the unit can be referenced by the pre-trained model reading unit 201. The pre-trained model reading unit 201 may load the read pre-trained model into a memory of the information processing apparatus 200.

The labeled data management unit 202 manages labeled data (e.g., labeled image data). For example, the labeled data management unit 202 may store a plurality of pieces of labeled data in such a manner that each of the pieces of labeled data can be individually read. The labeled data management unit 202 may use a database or the like to manage the labeled data.

For example, FIG. 3 illustrates an example of a data structure for management of the labeled data. In the example illustrated in FIG. 3, an identification (ID) is allocated to each piece of labeled data, and information about a label added to the labeled data and information about a path to the labeled data are associated with the ID. As a specific example, "label A" is added as a label to the labeled data to which "1" is allocated as the ID, and the labeled data is stored at a position indicated by "AAA\BBB\CCC".

In the example illustrated in FIG. 3, the labeled data is managed as a file. However, a method for managing the labeled data is not particularly limited as long as the data can be managed. As a specific example, the labeled data management unit 202 may manage the labeled data as Base 64 format data. In this case, the labeled data management unit 202 may convert the file of the labeled data into Base 64 format data, as needed.

The score estimation unit 203 estimates correct answer information (label) that can be added to target data to be annotated and a score representing a likelihood that the target data is what is indicated by the correct answer information based on the read pre-trained model. Specifically, the score estimation unit 203 may use the pre-trained model read by the pre-trained model reading unit 201 to estimate a label indicating target data and estimate a score representing the likelihood that the target data is what is indicated by the label. The score is represented, for example, in the form of probability that the label indicates the target data (i.e., probability that the target data is what is indicated by the label).

The estimation result management unit 204 manages the correct answer information (label) that can be added to the target data and the score for the correct answer information, which are estimated by the score estimation unit 203.

For example, FIG. 4 illustrates an example of a data structure for managing an estimation result with regard to the label that can be added to the target data and the score for the label, for each target data. In the example illustrated in FIG. 4, information corresponding to a score estimation result for each label is associated with the ID allocated to each piece of labeled data. In the example illustrated in FIG. 4, the score estimation result for each of "label A", "label B", "label C", and "label D" is associated with the ID. As a specific example, the labeled data to which "1" is allocated as the ID indicates that the score for "label A" is "0.7", the score for "label B" is "0.4", the score for "label C" is "0.2", and the score for "label D" is "0.1".

The label candidate input unit 205 receives designation of a candidate for the label (hereinafter also referred to as a candidate label) to be added as an annotation to target data from the user who performs the annotation operation. As a specific example, in a situation where the user is wondering which one of the labels is to be added to the target data, the label candidate input unit 205 functions as an interface for inputting the candidate for the label to the information processing apparatus 200.

The candidate data determination unit 206 determines the labeled data, which is used to present reference information to the user who performs the annotation operation, to be candidate data. Specifically, the candidate data determination unit 206 determines the candidate data based on one or more candidate labels input via the label candidate input unit 205 and the information managed by the estimation result management unit 204. Processing to be performed by the candidate data determination unit 206 will be described in detail below.

The candidate data extraction unit 207 reads the labeled data that matches a desired condition from the labeled data management unit 202. For example, the candidate data extraction unit 207 may extract the labeled data determined to be the candidate data by the candidate data determination unit 206 from the pieces of data managed by the labeled data management unit 202.

The candidate data output unit 208 outputs information corresponding to the candidate data (labeled data) extracted by the candidate data extraction unit 207 to a predetermined output destination. Thus, the candidate data output unit 208 can present the information corresponding to the candidate data to the user as reference information based on which the user can determine which correct answer information is to be added to the target data.

The candidate data input unit 209 receives, from the user, designation of a piece of candidate data that is closer in meaning to the target data among pieces of candidate data for which information is presented to the user. As a specific example, the candidate data input unit 209 may receive, from the user, designation of the piece of candidate data that is closer to the target data among the pieces of candidate data presented to the user by the candidate data output unit 208.

(Processing)

Next, an example of processing to be performed by the information processing apparatus 200 according to the present exemplary embodiment will be described below. An example of a series of procedures of processing for presenting reference information to add a label to target data will be described with reference to FIG. 5.

In step S501, the label candidate input unit 205 receives, from the user, designation of a candidate for a label to be added as an annotation to the target data. For example, FIG. 6 illustrates an example of an operation screen (user interface) on which the designation of the label candidates is received from the user.

An operation screen 600 includes an image display area 610, a label candidate presentation area 620, a determine button 601, and a sample image display button 602. The image display area 610 is an area where an image 611 corresponding to image data (target data) to be annotated is displayed. The label candidate presentation area 620 is an area where one or more candidate labels are presented as candidates for the label to be added as an annotation to the target data and where designation of at least some of the one or more candidate labels are received from the user. The determine button 601 is a button for receiving, from the user, an instruction to determine the candidate label designated in the label candidate presentation area 620 as the label to be added to the target data. The sample image display button 602 is a button for receiving an instruction to display a sample image from the user.

Figure 6:
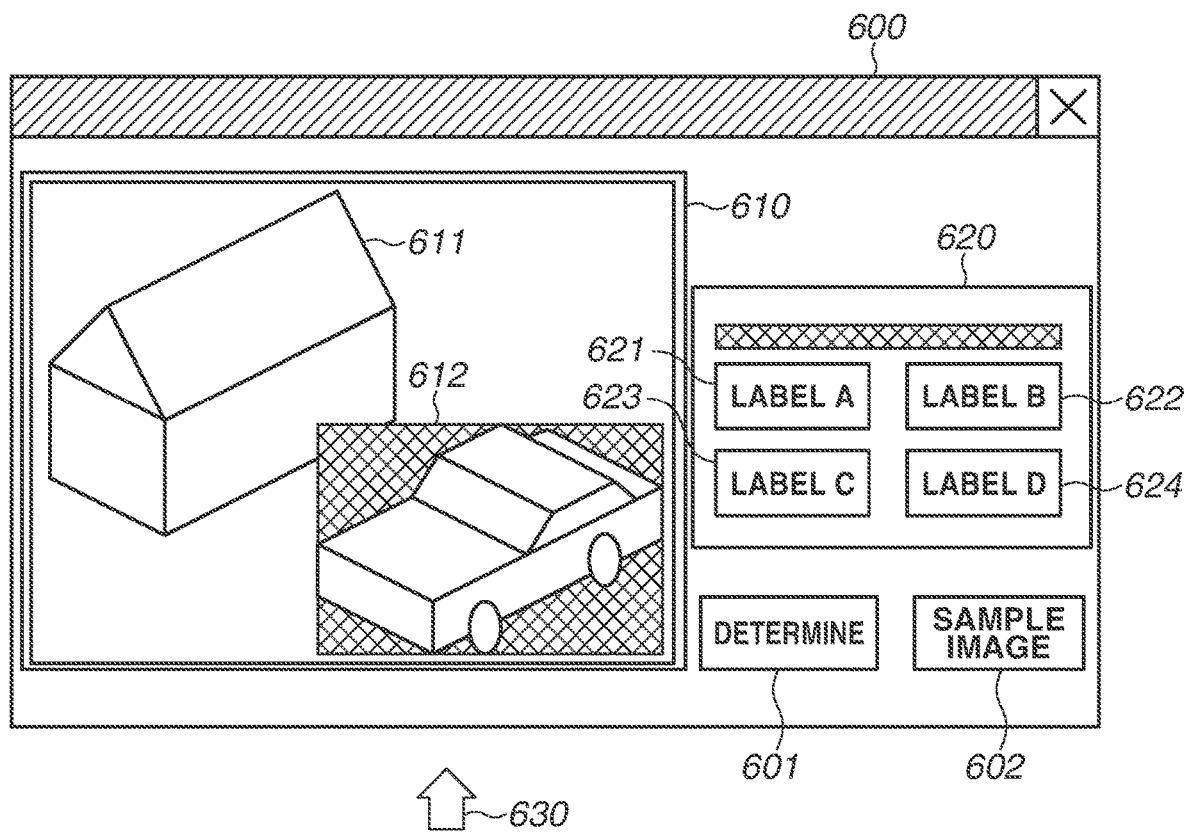
FIG. 6 illustrates an example of an operation screen for receiving designation of a label candidate according to one embodiment.

In the example illustrated in FIG. 6, a target area 612 to which the label is to be added as an annotation is designated for the image 611 displayed in the image display area 610. The target area 612 is set based on, for example, designation by the user using a pointer 630. To operate the pointer 630, for example, the input device 116, such as a pointing device connected to the information processing apparatus 200, is used. As a specific example, an area with four corners corresponding to four points designated on the image 611 by the pointer 630 may be set as the target area 612. This operation method is merely an example, and the operation method for setting the target area 612 is not particularly limited as long as at least part of the area of the image 611 can be designated.

In the example illustrated in FIG. 6, candidate buttons 621 to 624 corresponding to the candidate labels of "label A" to "label D", respectively, are presented in the label candidate presentation area 620. Each of the candidate buttons 621 to 624 is a button for receiving, from the user, designation of the candidate label associated with the corresponding candidate button.

The example illustrated in FIG. 6 is merely an example, and the configuration for presenting information with respect to receiving the designation of the candidate labels is not necessarily limited to the example illustrated in FIG. 6. For example, the number of buttons presented in the label candidate presentation area 620 is not limited to four. For example, in other embodiments, the number of buttons may be changed depending on the number of candidate labels. The candidate label that can be selected may be changed depending on an object to be annotated. As a specific example, the candidate label that can be selected may be determined depending on an estimation result based on the pre-trained model for a partial image included in the designated target area 612. In this case, a predetermined number of (e.g., four) labels with higher scores in a series of labels obtained as the estimation result may be determined to be the candidate labels.

The label candidate input unit 205 acquires a label corresponding to a pressed candidate button as the candidate label when the sample image display button 602 is pressed after the target area 612 is designated and any one of the candidate buttons 621 to 624 is pressed. Pressing of each of the candidate buttons 621 to 624 and pressing of the sample image display button 602 are implemented by, for example, operating the pointer 630 using a pointing device or the like.

Referring back to FIG. 5, in step S502, the candidate data determination unit 206 sets a feature space using the score representing the likelihood that the target data is what is indicated by the candidate label as an axis based on the information managed by the estimation result management unit 204 and the candidate labels acquired in step S501. Processing for setting the feature space will be described in detail below with reference to FIG. 8.

In step S503, the candidate data determination unit 206 determines candidate data (e.g., a candidate image) for which information is presented to the user by using the feature space set in step S502. Processing for determining the candidate data for which information is presented to the user will be described in detail below with reference to FIG. 10.

In step S504, the candidate data extraction unit 207 extracts the candidate data based on the determination result in step S503 from the pieces of data managed by the labeled data management unit 202.

Figure 7:
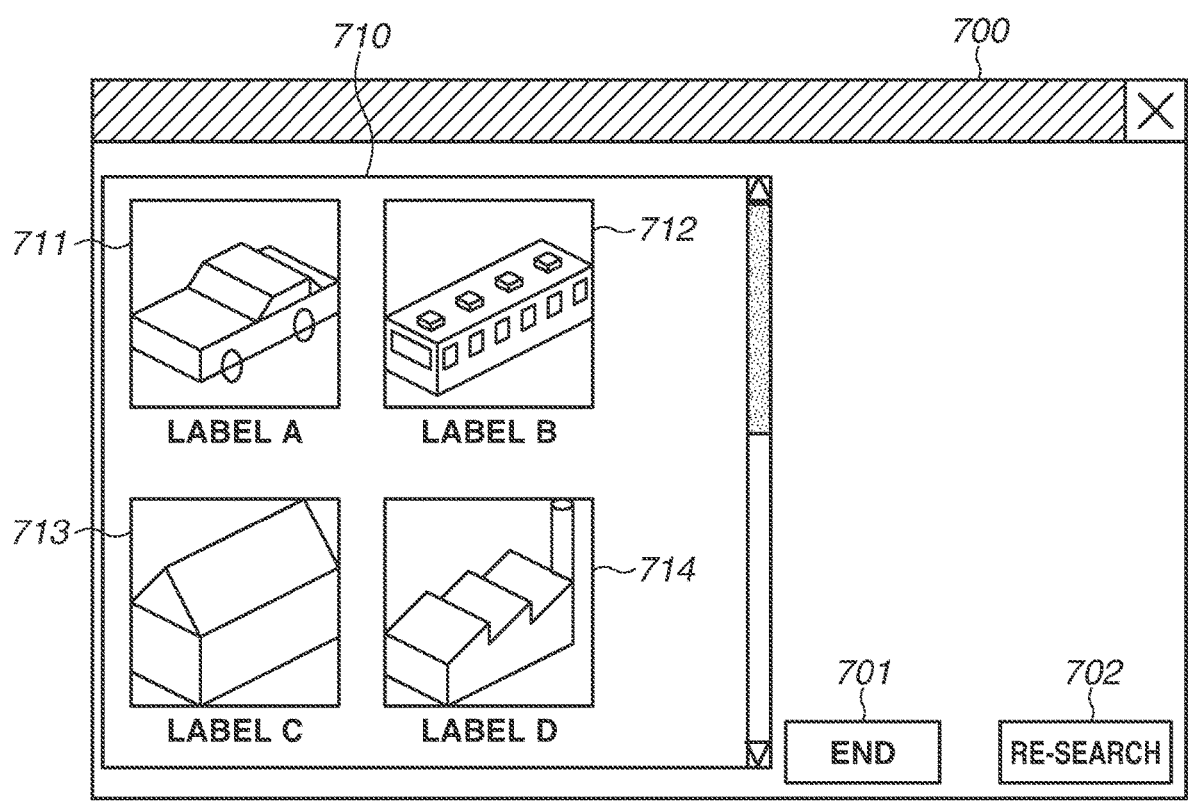
FIG. 7 illustrates an example of an output screen for presenting information based on candidate data according to one embodiment.

In step S505, the candidate data output unit 208 outputs information corresponding to the candidate data extracted in step S504 to a predetermined output destination, thereby presenting the information to the user. As a specific example, the candidate data output unit 208 may cause a display device, such as a display, to display an image corresponding to image data extracted as the candidate data, thereby presenting the image to the user. For example, FIG. 7 illustrates an example of an output screen (user interface) for presenting the information corresponding to the candidate data to the user. In particular, FIG. 7 illustrates an example of a screen for presenting the image corresponding to the image data extracted as the candidate data to the user.

An output screen 700 includes a candidate image display area 710, an end button 701, and a re-search button 702. The candidate image display area 710 is an area where an image corresponding to image data extracted as the candidate data (hereinafter also referred to as a candidate image) is displayed. In the example illustrated in FIG. 7, candidate images 711 to 714 are displayed as images corresponding to the image data extracted as the candidate data in the candidate image display area 710. In the vicinity of each of the candidate images 711 to 714, information indicating the label added to each of the candidate images 711 to 714 is displayed. The end button 701 is a button for receiving, from the user, an instruction with respect to termination of the display of the candidate image. The re-search button 702 is a button for receiving, from the user, an instruction with respect to re-searching the candidate image.

The example illustrated in FIG. 7 is merely an example, and the configuration for presenting information corresponding to the candidate data is not necessarily limited to the example illustrated in FIG. 7. For example, the number of candidate images displayed in the candidate image display area 710 is not limited to four. More than four images may be displayed, or less than four images may be displayed. If it is difficult to display a series of candidate images to be displayed in the candidate image display area 710, the candidate image display area 710 may be configured to be scrollable by a scrolling operation using a scroll bar or the like, to thereby expand the display area for candidate images.

Referring back to FIG. 5, in step S506, the candidate data determination unit 206 determines whether the termination of the processing for extracting the candidate data is instructed. For example, if the end button 701 is pressed on the output screen 700 illustrated in FIG. 7, the candidate data determination unit 206 may determine that the termination of the processing for extracting the candidate data is instructed.

In step S506, if the candidate data determination unit 206 determines that the termination of the processing for extracting the candidate data is not instructed (NO in step S506), the processing proceeds to step S507. In step S507, the candidate data input unit 209 receives, from the user, designation of at least one of the pieces of candidate data on which information is presented to the user in step S505. Further, the candidate data determination unit 206 acquires, from the candidate data input unit 209, the candidate data, the designation of which is received by the candidate data input unit 209 from the user.

As a specific example, the candidate data input unit 209 receives designation of any one of the candidate images 711 to 714 displayed in the candidate image display area 710 on the output screen 700 illustrated in FIG. 7. Then, the candidate data input unit 209 acquires the candidate data (image data) corresponding to the designated candidate image when the re-search button 702 is pressed in a state where any one of the candidate images 711 to 714 is designated, and outputs the acquired candidate data to the candidate data determination unit 206. Then, the candidate data determination unit 206 executes the processing of step S502 and subsequent steps again based on the candidate data acquisition result.

Figure 5:
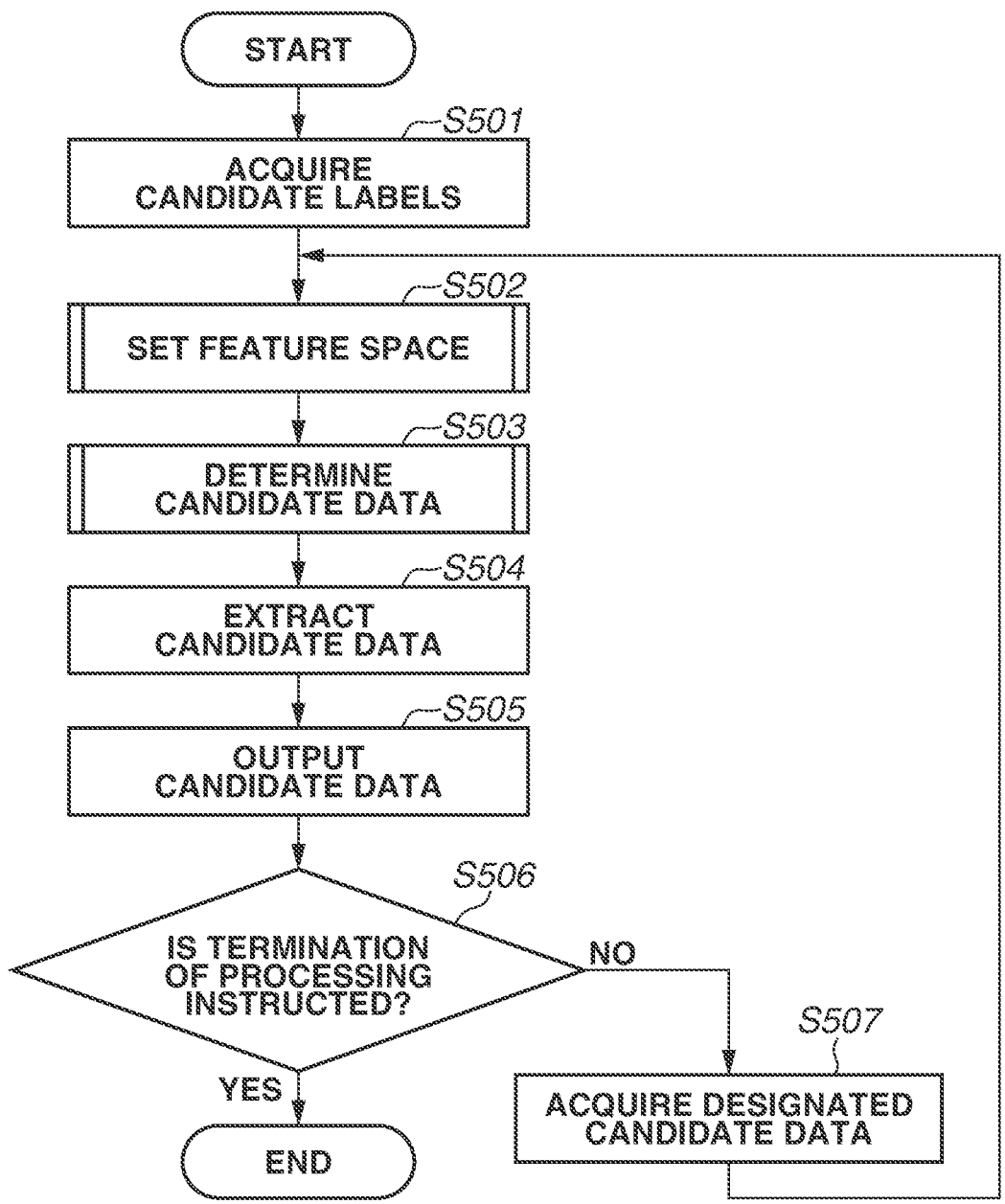
FIG. 5 is a flowchart illustrating an example of processing to be performed by the information processing apparatus according to one embodiment.

On the other hand, in step S506, if the candidate data determination unit 206 determines that the termination of the processing for extracting the candidate data is instructed (YES in step S506), the series of procedures of the processing illustrated in FIG. 5 is terminated.

Next, an example of processing with regard to a feature space setting illustrated as the processing of step S502 in FIG. 5 will be described with reference to FIG. 8.

In step S801, the candidate data determination unit 206 sets the feature space using each of the candidate labels acquired in step S501 as an axis.

In step S802, the candidate data determination unit 206 plots pieces of labeled data in the feature space set in step S801 based on pieces of information (information corresponding to the estimation result obtained by the score estimation unit 203) managed by the estimation result management unit 204. Thus, point group data corresponding to the pieces of labeled data is defined on the feature space.

In step S803, the candidate data determination unit 206 determines whether the candidate data (e.g., image data corresponding to the designated candidate image) acquired in the processing of step S507 illustrated in FIG. 5 is input.

If the candidate data determination unit 206 determines that the candidate data is not input in step S803 (NO in step S803), the processing proceeds to step S804. In step S804, the candidate data determination unit 206 acquires a maximum value and a minimum value of the score for each candidate label, which defines each axis of the feature space, as a range of the point group data defined in step S802 in the feature space.

In step S805, the candidate data determination unit 206 calculates an intermediate value between the maximum value and the minimum value acquired in step S804 for each axis (i.e., for each candidate label) with respect to setting of the feature space.

In step S806, the candidate data determination unit 206 divides at least an area where the point group data is present (points are distributed) in the feature space into a plurality of quadrants based on the maximum value, the minimum value, and the intermediate value, which are acquired or calculated for each axis with respect to setting of the feature space. Thus, the plurality of quadrants is set in at least the area where the point group data is present in the feature space.

For example, FIGS. 9A to 9F are explanatory diagrams each illustrating processing for setting the plurality of quadrants by dividing the area where the point group data is present in the feature space. In examples illustrated in FIGS. 9A to 9F, to facilitate explanation of technical features according to the present exemplary embodiment, a feature space 900 is set as a two-dimensional space using the score for the label A as a horizontal axis 901 and the score for the label B as a vertical axis 902, for convenience of the explanation.

Specifically, FIG. 9A schematically illustrates a state where points 903 corresponding to the respective pieces of labeled data are plotted in the processing of step S802 in the feature space 900 set in the processing of step S801.

FIG. 9B schematically illustrates an area 910 where the point group data is present. The area 910 is defined based on the maximum value and the minimum value acquired for each axis in the processing of step S804.

FIG. 9C schematically illustrates a state where the area 910 where the point group data is present in the feature space is divided into a plurality of quadrants 911 to 914 based on a calculation result of the intermediate value in the processing of step S805. Specifically, in the example illustrated in FIG. 9C, the area 910 is divided into the plurality of quadrants 911 to 914 by a straight line that passes through the intermediate value of the score for the label A and is perpendicular to the horizontal axis 901 and a straight line that passes through the intermediate value of the score for the label B and is perpendicular to the vertical axis 902.

While the examples illustrated in FIGS. 9A to 9F illustrate a case where two candidate labels are used for simplicity of explanation, three or more candidate labels may be used to set the feature space. In this case, the feature space set in step S801 is a three-dimensional or higher-dimensional feature space.

Referring back to FIG. 8, in step S803, if the candidate data determination unit 206 determines that the candidate data is input (YES in step S803), the processing proceeds to step S807. In step S807, the candidate data determination unit 206 identifies a point corresponding to the candidate data (candidate data designated by the user) acquired in the processing of step S507 in the point group data set in the feature space. Then, the candidate data determination unit 206 acquires coordinates of the identified point 903 in the feature space.

In step S808, the candidate data determination unit 206 sets a new area obtained by dividing the length of each side of the area that combines the four quadrants previously set in step S806 into two with the coordinates acquired in step S807 at the center.

Next, in step S806, the candidate data determination unit 206 divides the new area set in step S808 into a plurality of new quadrants based on an idea similar to that of the processing of step S806 described above.

Referring back to FIGS. 9A to 9F, FIG. 9D schematically illustrates a state where a point 915 corresponding to the candidate data acquired in step S507 is identified in the processing of step S807. FIG. 9E schematically illustrates a state where a new area 920 obtained by dividing the length of each side of the area that combines the four quadrants 911 to 914 (i.e., the area 910) into two is set with the point 915 at the center. Thus, the new area 920 is set using the point 915, which corresponds to the candidate data designated by the user, as a base point.

FIG. 9F schematically illustrates a state where the new area 920 set in the feature space is divided into a plurality of new quadrants 921 to 924 in the processing of step S806 after the processing of steps S807 and S808 is executed.

The examples illustrated in FIGS. 9A to 9F illustrate a case where the area set based on the maximum value and the minimum value for each axis is divided into the plurality of quadrants based on the intermediate value between the maximum value and the minimum value. However, the examples are not intended to limit the method of setting each of the quadrants. As a specific example, clustering of the point group data set in step S802 may be performed, and each cluster set by the clustering may be set as a quadrant.

Next, an example of the processing for determining the candidate data illustrated as the processing of step S503 in FIG. 5 will be described with reference to FIG. 10.

Figure 8:
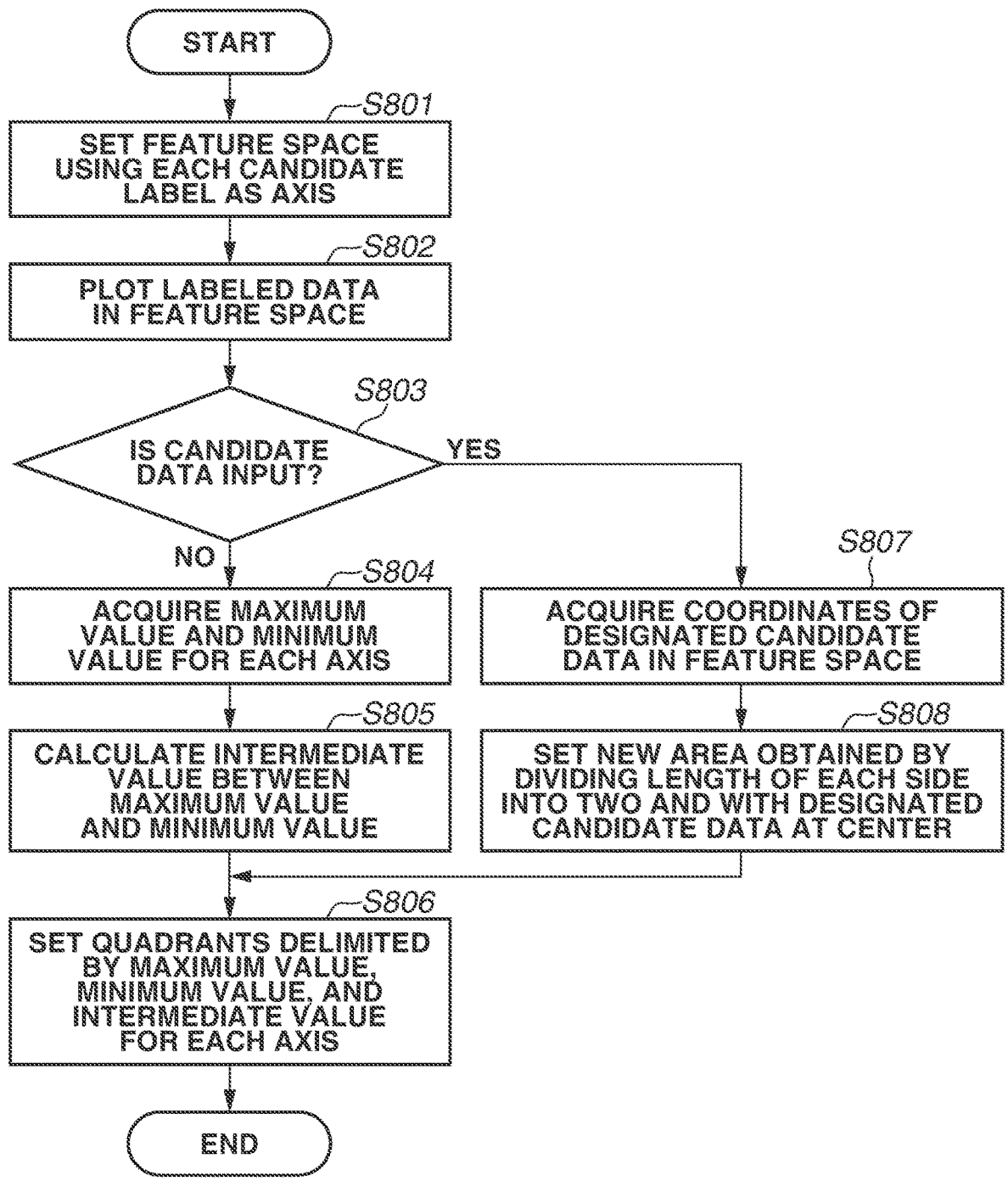
FIG. 8 is a flowchart illustrating an example of processing to be performed by the information processing apparatus according to one embodiment.

In step S1001, the candidate data determination unit 206 calculates the position (coordinates) of a central point of each quadrant set in the processing of step S806 illustrated in FIG. 8.

In step S1002, the candidate data determination unit 206 calculates a distance in the feature space between the position of the central point calculated for each quadrant in step S1001 and the position of each point included in the point group data set in the processing of step S802 illustrated in FIG. 8.

In step S1003, the candidate data determination unit 206 identifies, for each quadrant, a point that is located the closest to the central point of the quadrant based on a calculation result obtained in step S1002, i.e., the distance between the central point of each quadrant and each of the points included in the point group data. Further, the candidate data determination unit 206 determines the labeled data corresponding to the identified point for each quadrant to be the candidate data representing the quadrant. Then, the candidate data extraction unit 207 extracts the labeled data determined to be the candidate data by the candidate data determination unit 206 from the pieces of labeled data managed by the labeled data management unit 202.

By the control processing described above, more probable candidate data are sequentially designated (e.g., selected) by the user from the pieces of candidate data presented as reference information. Thus, the range of the candidate data to be presented as the reference information in the feature space is sequentially limited. Accordingly, even in a situation where there is no significant difference in reliability among a plurality of different labels, the user sequentially designates more probable candidate data from the presented candidate data, thereby making it possible to efficiently narrow down the semantic range of the candidate data for which information is presented.

This configuration enables the user to select a label to be desirably added to target data by a simple operation without the need for checking a vast number of pieces of candidate data (labeled data). In other words, with the technique according to the present exemplary embodiment, it is expected that an advantageous effect of assisting the user to perform the labeling operation can be obtained in a more desirable manner even in a situation where there is no significant difference in reliability among the labels indicating different objects and thus it is desirable for the user to carefully perform the labeling operation.

A second exemplary embodiment of the present disclosure will be described below. To distinguish an information processing apparatus according to the second exemplary embodiment from information processing apparatuses according to other exemplary embodiments, the information processing apparatus according to the second exemplary embodiment is hereinafter referred to as an information processing apparatus 1100 for convenience of explanation.

In the first exemplary embodiment described above, the set feature space is divided into the plurality of quadrants and the candidate data is extracted one from each of the quadrants. In the second exemplary embodiment, the number of pieces of candidate data to be extracted from each quadrant is changed based on a score representing a likelihood that target data to be annotated is what is indicated by each candidate label. Accordingly, differences between the features of the technique according to the second exemplary embodiment and the features of the technique according to the first exemplary embodiment will be mainly described below, and detailed descriptions of parts that are substantially the same as those of the first exemplary embodiment are omitted.

(Functional Configuration)

An example of a functional configuration of the information processing apparatus 1100 according to the present exemplary embodiment will be described with reference to FIG. 11. The information processing apparatus 1100 according to the present exemplary embodiment differs from the information processing apparatus 200 illustrated in FIG. 2 in that the information processing apparatus 1100 includes a target data input unit 1101.

The target data input unit 1101 receives an input of target data to be annotated. The information processing apparatus 1100 according to the present exemplary embodiment estimates a label that can be added to the target data received by the target data input unit 1101 and a score for the label based on a pre-trained model, and uses an estimation result for processing for determining candidate data. Details of the processing and processing to be performed by the information processing apparatus 1100 according to the present exemplary embodiment will be described in detail below.
(Processing)

Next, an example of the processing to be performed by the information processing apparatus 1100 according to the present exemplary embodiment will be described below.

First, an example of a series of procedures of processing for presenting reference information to add a label to target data will be described with reference to FIG. 12. The example illustrated in FIG. 12 differs from the example illustrated in FIG. 5 in that processing of steps S1201 and S1202 is added and part of the processing of step S503 is changed.

In step S1201, the target data input unit 1101 receives an input of target data to be annotated. To receive the input of the target data, for example, the operation screen (user interface) 600 described with reference to FIG. 6 may be used.

As a specific example, when the sample image display button 602 is pressed after the target area 612 is designated in the image display area 610, image data on a partial image corresponding to the target area 612 in the image displayed in the image display area 610 may be acquired as the target data.

In step S1202, the score estimation unit 203 estimates a label that can be added to the target data acquired in step S1201 and a score representing a likelihood that the target data is what is indicated by the label.

Subsequently, the processing of steps S501 and S502 is executed, and then processing for determining the candidate data is executed in step S503.

An example of the processing of step S503 in the example illustrated in FIG. 12 will be described with reference to FIG. 13. The example illustrated in FIG. 13 differs from the example illustrated in FIG. 10 in that processing of steps S1301 and S1302 is included in place of the processing of step S1003.

In step S1301, the candidate data determination unit 206 plots the target data in the feature space set in step S502 based on the score for each label estimated for the target data in step S1202.

In step S1302, the candidate data determination unit 206 calculates a distance between the position of the target data plotted in the feature space in step S1301 and the central point of each quadrant set in step S1001. Then, the candidate data determination unit 206 controls the number of pieces of target data to be determined from each quadrant so that a larger number of pieces of candidate data can be determined from quadrants closer to the position of target data.

As a specific example, from the quadrant that is the closest to the position of target data, the candidate data determination unit 206 may determine three pieces of candidate data that are the closest to the central point of the quadrant. In this case, from the quadrant that shares a side with the quadrant that is the closest to the position of target data, the candidate data determination unit 206 may determine two pieces of candidate data that are the closest to the central point of the quadrant. Further, from the quadrant that shares a point with the quadrant that is the closest to the position of target data, the candidate data determination unit 206 may determine one piece of candidate data that is the closest to the central point of the quadrant. Then, the processing of steps S504 to S507 illustrated in FIG. 12 is executed as in the example illustrated in FIG. 5.

In the example described above, the number of pieces of candidate data to be extracted from each quadrant is set to a fixed number depending on closeness to the position of the target data. However, the operation of the information processing apparatus according to the present exemplary embodiment is not necessarily limited in this manner.

As a specific example, the number of pieces of candidate data to be extracted from each quadrant may be changed based on designation by the user depending on the closeness to the position of the target data. In another example, the number of pieces of candidate data to be extracted from each quadrant may be changed depending on the distance between the position of target data and the central point of each quadrant. While the central point is used as a representative point of each quadrant in the above-described exemplary embodiments, any point other than the central point may be used.

A third exemplary embodiment of the present disclosure will be described below. To distinguish an information processing apparatus according to the third exemplary embodiment from information processing apparatuses according to other exemplary embodiments, the information processing apparatus according to the third exemplary embodiment is hereinafter referred to as an information processing apparatus 1400 for convenience of explanation.

In the second exemplary embodiment described above, the number of pieces of candidate data to be extracted from each quadrant is changed based on the score representing the likelihood that the target data to be annotated is what is indicated by each candidate label. In the present exemplary embodiment, if the distance between the target data and the candidate data selected by the user in the feature space is successively increased a predetermined number of times or more, predetermined information is provided to the user based on the score representing the likelihood that the target data is what is indicated by each candidate label. Accordingly, differences between the features of the technique according to the third exemplary embodiment and the features of the technique according to the second exemplary embodiment will be mainly described below, and detailed descriptions of parts that are substantially the same as those of the second exemplary embodiment are omitted.
(Functional Configuration)

An example of a functional configuration of the information processing apparatus 1400 according to the present exemplary embodiment will be described with reference to FIG. 14. The information processing apparatus 1400 according to the present exemplary embodiment differs from the information processing apparatus 1100 illustrated in FIG. 11 in that the information processing apparatus 1400 includes a notification unit 1401.

The notification unit 1401 causes a predetermined output unit to provide notification information depending on a predetermined condition, thereby presenting the notification information to the user. As a specific example, if the distance between the target data and the candidate data selected by the user in the feature space is increased a predetermined number of times or more, the notification unit 1401 may present the notification information indicating a warning to the user.

(Processing)

Figure 15:
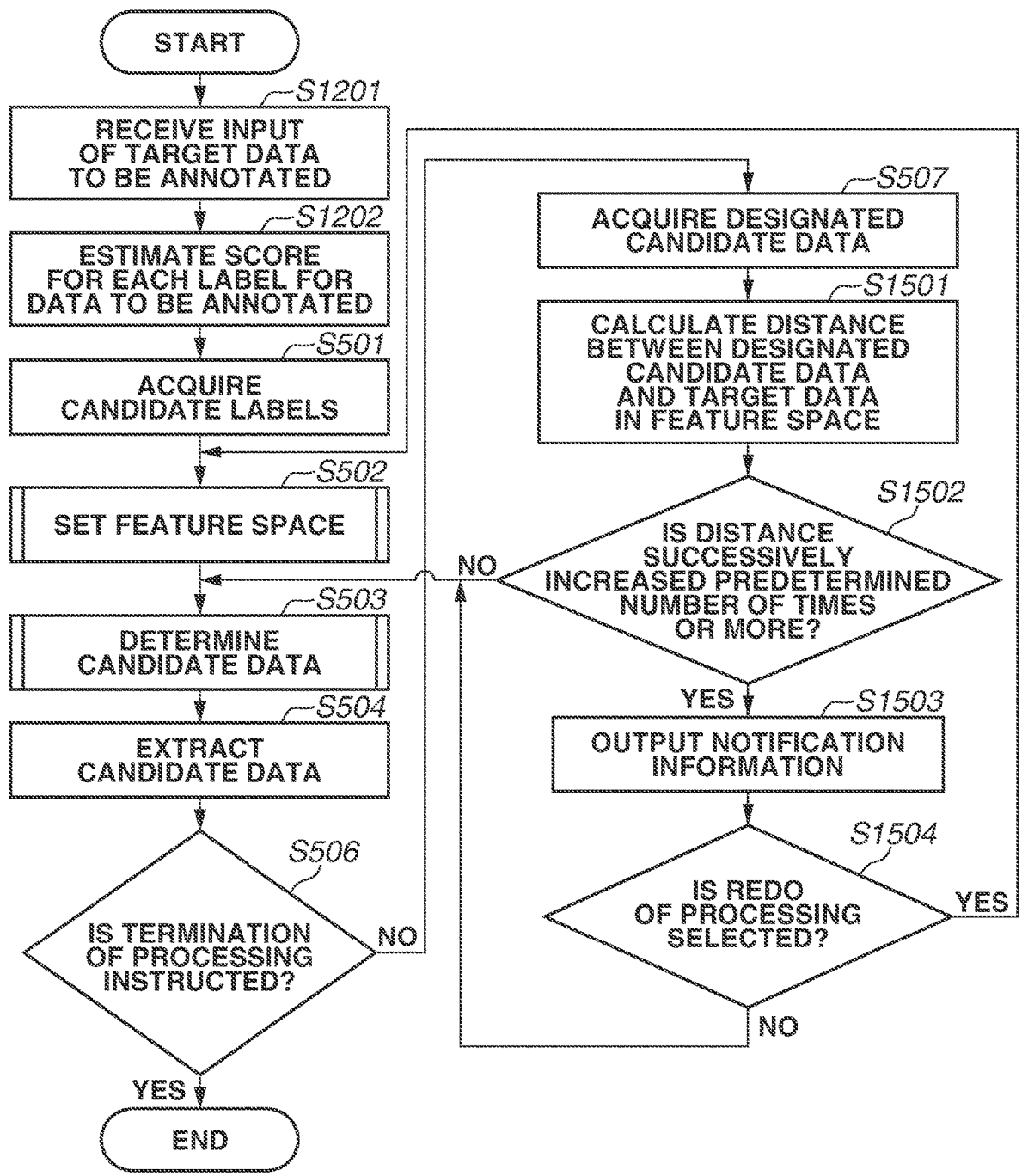
FIG. 15 is a flowchart illustrating yet another example of processing to be performed by the information processing apparatus according to one embodiment.

Next, an example of processing to be performed by the information processing apparatus 1400 according to the present exemplary embodiment will be described below with reference to FIG. 15, in particular, by focusing on a series of procedures of processing for presenting reference information to add a label to target data. The example illustrated in FIG. 15 differs from the example illustrated in FIG. 12 in that processing of steps S1501 to S1504 is added as processing subsequent to step S507.

In step S1501, the candidate data determination unit 206 calculates the distance between the position of the target data plotted in step S1301 in the feature space set in step S502 and the position of the candidate data designated in step S507.

In step S1502, the candidate data determination unit 206 determines whether the distance calculated in step S1501 is successively increased a predetermined number of times or more in a situation where the processing of step S507 is sequentially executed a plurality of times. As a specific example, the candidate data determination unit 206 may determine whether the distance calculated in step S1501 is successively increased three times or more.

In step S1502, if the candidate data determination unit 206 determines that the distance calculated in step S1501 is not successively increased the predetermined number of times or more (NO in step S1502), the processing returns to step S503. In this case, the processing of step S503 and subsequent steps are executed again.

On the other hand, in step S1502, if the candidate data determination unit 206 determines that the distance calculated in step S1501 is successively increased the predetermined number of times or more (YES in step S1502), the processing proceeds to step S1503. In step S1503, the notification unit 1401 causes the predetermined output unit to provide notification information (e.g., notification information indicating a warning), thereby presenting the notification information to the user.

Figure 16:
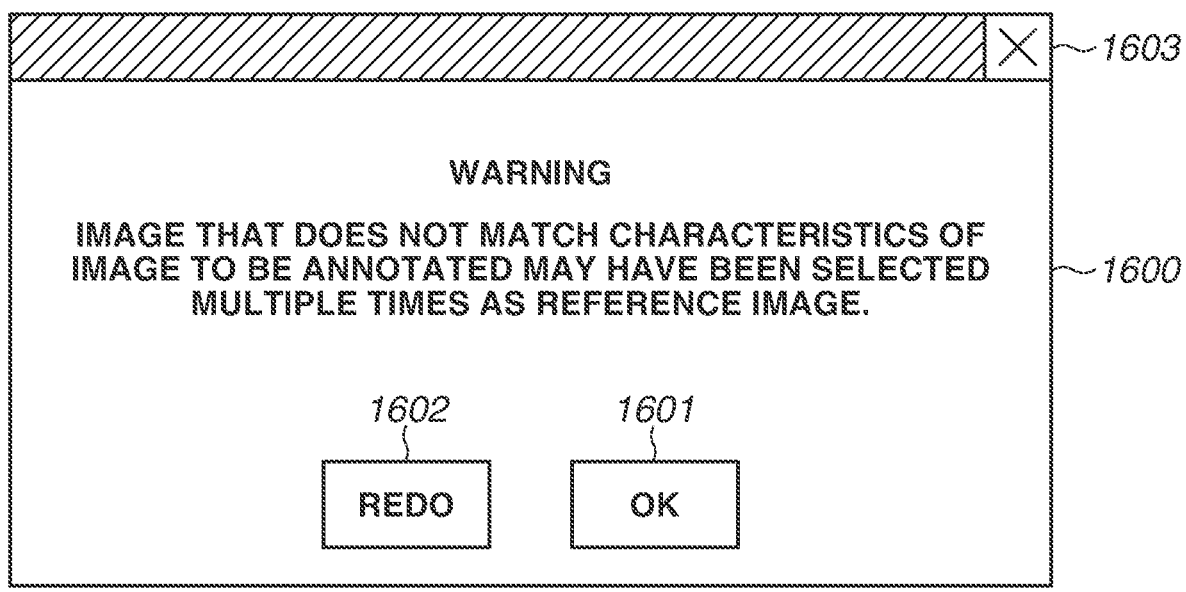
FIG. 16 illustrates an example of a dialog for presenting notification information according to one embodiment.

For example, FIG. 16 illustrates an example of a dialog (user interface) for presenting predetermined notification information to the user as display information. A dialog 1600 displays the notification information (e.g., character information) indicating a warning, thereby presenting the notification information to the user. The dialog 1600 includes an OK button 1601, a redo button 1602, and a close button 1603.

The OK button 1601 is a button for receiving an instruction to continue the processing that is currently executed from the user. The redo button 1602 is a button for interrupting the processing that is currently executed and receiving, from the user, an instruction to redo the processing for determining candidate data (to execute the processing again from the setting of the feature space). The close button 1603 is a button for receiving an instruction to close the dialog 1600 from the user. In the present exemplary embodiment, when the close button 1603 is pressed, processing similar to the processing performed when the OK button 1601 is pressed is applied.

In step S1504, the candidate data determination unit 206 determines whether a redo of the processing is selected. As a specific example, if pressing of the redo button 1602 on the dialog 1600 illustrated in FIG. 16 is detected, the candidate data determination unit 206 may determine that the redo of the processing is selected. On the other hand, if pressing of the OK button 1601 or the close button 1603 on the dialog 1600 is detected, the candidate data determination unit 206 may determine that the redo of the processing is not selected.

In step S1504, if the candidate data determination unit 206 determines that the redo of the processing is selected (YES in step S1504), the processing returns to step S502. In this case, the feature space setting processing illustrated as the processing of step S502 is executed again.

On the other hand, in step S1504, if the candidate data determination unit 206 determines that the redo of the processing is not selected (NO in step S1504), the processing returns to step S503. In this case, the processing for determining candidate data illustrated as the processing of step S503 is executed again.

The present exemplary embodiment described above illustrates an example where notification information (e.g., warning) is provided when the distance between the target data and the selected candidate data is successively increased the predetermined number of times or more. However, the processing to be performed by the information processing apparatus according to the present exemplary embodiment is not necessarily limited to this.

As a specific example, notification information may be provided depending on whether the target data and the selected candidate data are spaced apart from each other by a predetermined distance or more. In another example, the distance between the target data and the candidate data may be accumulated every time the candidate data is selected and the notification information may be provided when an accumulated value of the distance exceeds a threshold. Thresholds used for determination of the number of times, the distance, the accumulated value of the distance, and the like may be fixed values, or may be changed based on an instruction from the user.

In the example of the processing described above, the determination in step S1504 provides the user with two options, i.e., an option to continue the processing and an option to redo the processing from the setting of the feature space. However, the options that can be selected by the user in the determination are not limited to this example.

As a specific example, an option to resume the processing from a state where the previous candidate data is selected may be provided. In this case, processing for storing a status of the feature space when the previous candidate data is selected may be added. In this case, an interface (e.g., a button) for receiving, from the user, an instruction to resume the processing from the state where the previous candidate data is selected may be provided on the dialog 1600 illustrated in FIG. 16.

Various embodiments of the present disclosure can also be implemented by processing in which a program for implementing one or more functions according to the above-described exemplary embodiments is supplied to a system or an apparatus via a network or a recording medium, and one or more processors in a computer of the system or the apparatus read and execute the program. Various embodiments can also be implemented by a circuit (e.g., an application specific integrated circuit (ASIC)) for implementing one or more functions according to the above-described exemplary embodiments.

The above-described embodiments are merely examples and may be modified or changed in various ways without departing from the scope of the technique according to the present disclosure.

For example, the functions of the information processing apparatus according to the present exemplary embodiment may be implemented by a plurality of apparatuses in a cooperative manner. As a specific example, some of the components of the information processing apparatuses illustrated in FIGS. 2, 11, and 14 may be provided in an external apparatus different from the information processing apparatuses. Further, a load on the processing performed by at least some of the components of the information processing apparatuses illustrated in FIGS. 2, 11, and 14 may be distributed to a plurality of apparatuses. While the exemplary embodiments have been described by focusing on the case where the image data is mainly used as data to which a label is added as an annotation, the type of the data is not necessarily limited to the image data as described above. Furthermore, the method of presenting related information and the method of receiving designation of the target data from the user may be appropriately changed depending on the type of the data to which a label is added as an annotation.

According to various embodiments of the present disclosure, it is possible to assist a user to select a label to be added as an annotation in a more desirable manner.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described herein, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-095403, filed Jun. 1, 2020, which is hereby incorporated by reference herein in its entirety.

What is claimed is:

1. An information processing apparatus comprising:
one or more processors; and
one or more memories storing instructions that, when executed by the one or more processors, cause the information processing apparatus to perform operations comprising:
receiving designation of multiple candidate labels as candidates for adding to data as an annotation;
acquiring, for each received data of a plurality of received data, scores representing, for each of the multiple candidate labels, a likelihood of the label being added to the received data as an annotation, wherein acquiring the scores includes inputting the multiple candidate labels and the received data into a trained first machine learning model, which outputs the scores based on the multiple candidate labels and on the received data, wherein the plurality of received data is arranged in a first feature space as labeled data based on the scores acquired for the each received data of the plurality of received data, and wherein the first feature space has a plurality of axes, wherein each axis of the plurality of axes corresponds to a magnitude of the scores of a respective label of the multiple candidate labels;
determining one or more first candidate data for each of a plurality of first sections into which the first feature space is divided,
wherein
each section of the plurality of first sections includes a respective part of the first feature space that is defined on the each axis of the plurality of axes, and
the one or more first candidate data is selected from among the labeled data arranged in the plurality of first sections of the first feature space; and
outputting, to a predetermined output destination, the one or more first candidate data determined for the plurality of first sections of the first feature space by the determining, wherein the output destination displays the one or more first candidate data to a user via a display.

2. The information processing apparatus according to claim 1, wherein the determining divides the first feature space where the labeled data are distributed into the plurality of first sections based on determining, for the each axis of the plurality of axes, an intermediate value between a maximum value and a minimum value of the scores that correspond to the corresponding respective label of such axis for the labeled data.

3. The information processing apparatus according to claim 1,
wherein the operations further comprise:
receiving designation of a target data in reply to the outputting of the one or more first candidate data, the designation based on selection of one of the one or more first candidate data from among the one or more first candidate data outputted to the output destination, and
determining a second feature space that includes a subset of the labeled data included in the first feature space, wherein a position of the target data in the first feature space is a base point around which the second feature space is located, and
for each of a plurality of second sections into which the second feature space is divided, determining one or more second candidate data based on the labeled data included in the plurality of second sections and outputting, to the output destination, the one or more second candidate data determined for the second feature space.

4. The information processing apparatus according to claim 3, wherein processing is performed for dividing, by the determining, the second feature space into the plurality of second sections, and determining, for the each of the plurality of second sections, respective second candidate data based on the labeled data included in the each of the plurality of second sections, and processing for outputting the respective second candidate data determined for the each of the plurality of second sections to the output destination.

5. The information processing apparatus according to claim 3, wherein the second feature space is defined so that a size of the second feature space is smaller than the first feature space.

6. The information processing apparatus according to claim 3, wherein the operations further comprise notifying the output destination of notification information in a case where respective distances from a location of a current designated target data in the second feature space to the one or more second candidate data increase by more than a predetermined amount relative to respective distances from the location of the current designated target data in the first feature space to the one or more first candidate data.

7. The information processing apparatus according to claim 1, wherein the determining controls how many first candidate data are determined for the each of the plurality of first sections depending on a distance between a designated target data and a respective center of the each of the plurality of first sections in the first feature space.

8. The information processing apparatus according to claim 7, wherein the determining controls the number of pieces of first candidate data determined for the each of the plurality of first sections to be increased for the first sections, of the plurality of first sections, that are closer to the designated target data in the first feature space.

9. The information processing apparatus according to claim 1, wherein the multiple candidate labels include at least four candidate labels, and wherein the first feature space has at least four axes.

10. The information processing apparatus according to claim 9, wherein the each axis of the plurality of axes corresponds to only the respective label of the multiple candidate labels.

11. The information processing apparatus according to claim 10, wherein the each axis of the plurality of axes is orthogonal to all other axes in the plurality of axes.

12. The information processing apparatus according to claim 1, wherein the operations further comprise:
performing a supervised training process on a second machine learning model, wherein at least some of the one or more first candidate data is included in the training data of the supervised training process.

13. The information processing apparatus according to claim 1, wherein the each axis of the plurality of axes is orthogonal to all other axes in the plurality of axes.

14. The information processing apparatus according to claim 1, wherein the each axis of the plurality of axes corresponds to only the respective label of the multiple candidate labels.

15. An information processing method to be executed by an information processing apparatus, the information processing method comprising:
receiving designation of multiple candidate labels as candidates for adding to data as an annotation;
acquiring, for each received data of a plurality of received data, scores representing, for each of the multiple candidate labels, a likelihood of the label being added to the received data as an annotation, wherein acquiring the scores includes inputting the multiple candidate labels and the received data into a trained first machine learning model, which outputs the scores based on the multiple candidate labels and on the received data, wherein the plurality of received data is arranged in a first feature space as labeled data based on the scores acquired for the each received data of the plurality of received data, and wherein the first feature space has a plurality of axes, wherein each axis of the plurality of axes corresponds to a magnitude of the scores of a respective label of the multiple candidate labels;
determining one or more first candidate data for each of a plurality of first sections into which the first feature space is divided,
wherein
each section of the plurality of first sections includes a respective part of the first feature space that is defined on the each axis of the plurality of axes, and
the one or more determined first candidate data is selected from among the labeled data arranged in the plurality of first sections of the first feature space; and
outputting, to a predetermined output destination, the one or more first candidate data determined for the plurality of first sections of the first feature space by the determining, wherein the output destination displays the one or more first candidate data to a user via a display.

16. A non-transitory computer-readable storage medium storing computer-executable program for causing a computer to perform a process comprising:
receiving designation of multiple candidate labels as candidates for adding to data as an annotation;
acquiring, for each received data of a plurality of received data, scores representing, for each of the multiple candidate labels, a likelihood of the label being added to the received data as an annotation, wherein acquiring the scores includes inputting the multiple candidate labels and the received data into a trained first machine learning model, which outputs the scores based on the multiple candidate labels and on the received data, wherein the plurality of received data is arranged in a first feature space as labeled data based on the scores acquired for the each received data of the plurality of received data, and wherein the first feature space has a plurality of axes, wherein each axis of the plurality of axes corresponds to a magnitude of the scores of a respective label of the multiple candidate labels;
determining one or more first candidate data for each of a plurality of first sections into which the first feature space is divided,
wherein
each section of the plurality of first sections includes a respective part of the first feature space that is defined on the each axis of the plurality of axes, and
the one or more determined first candidate data is selected from among the labeled data arranged in the plurality of first sections of the first feature space; and
outputting, to a predetermined output destination, the one or more first candidate data determined for the plurality of first sections of the first feature space by the determining, wherein the output destination displays the one or more first candidate data to a user via a display.

* * * * *